(12) United States Patent
Kilchyk

(10) Patent No.: US 11,933,281 B2
(45) Date of Patent: Mar. 19, 2024

(54) ARTICLES HAVING THERMALLY CONTROLLED MICROSTRUCTURE AND METHODS OF MANUFACTURE THEREOF

(71) Applicant: Hamilton Sundstrand Corporation, Charlotte, NC (US)

(72) Inventor: Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/520,011

(22) Filed: Nov. 5, 2021

(65) Prior Publication Data

US 2023/0144229 A1    May 11, 2023

(51) Int. Cl.
*F03G 7/06* (2006.01)
*B33Y 80/00* (2015.01)

(52) U.S. Cl.
CPC ......... *F03G 7/0616* (2021.08); *F03G 7/0614* (2021.08); *F03G 7/064* (2021.08); *B33Y 80/00* (2014.12)

(58) Field of Classification Search
CPC ..... F03G 7/06114; F03G 7/0614–0615; F03G 7/065
See application file for complete search history.

(56) References Cited

U.S. PATENT DOCUMENTS

| | | | |
|---|---|---|---|
| 10,442,002 B2 | 10/2019 | Benthien et al. | |
| 2007/0280722 A1* | 12/2007 | Katada | B41J 2/175 430/114 |
| 2011/0236713 A1 | 9/2011 | Radwan et al. | |
| 2013/0081389 A1* | 4/2013 | Browne | F03G 7/065 60/527 |
| 2013/0269176 A1* | 10/2013 | Ishida | F03G 7/065 29/622 |
| 2014/0157769 A1* | 6/2014 | Daly | F03G 7/065 60/527 |

(Continued)

FOREIGN PATENT DOCUMENTS

| | | | | |
|---|---|---|---|---|
| CN | 112222398 A | | 1/2021 | |
| EP | 1936468 A1 * | | 6/2008 | ............. F01D 17/14 |

(Continued)

OTHER PUBLICATIONS

Wei et al.; "An overview of laser-based multiple metallic material additive manufacturing: from macro- to micro-scales"; Int. J. Extrem. Manuf.; 3; Dec. 18, 2020, pp. 1-24.

(Continued)

*Primary Examiner* — Laert Dounis
(74) *Attorney, Agent, or Firm* — CANTOR COLBURN LLP

(57) ABSTRACT

In an embodiment, an article comprises a plurality of structural units, wherein each structural unit comprises a first portion; a second portion; wherein the second portion contacts the first portion; and a third portion; wherein the third portion is in communication with the first portion and the second portion and is more compressible than the first portion and the second portion; wherein the first portion comprises a first shape memory alloy having a first preset state and wherein the second portion comprises a second shape memory alloy that has a second preset state; wherein the second preset state is different from the first preset state.

16 Claims, 8 Drawing Sheets

(56) References Cited

U.S. PATENT DOCUMENTS

| | | | |
|---|---|---|---|
| 2017/0001263 A1 | 1/2017 | Steiner | |
| 2017/0234306 A1* | 8/2017 | Vanden Aker | F03G 7/065 |
| | | | 60/529 |
| 2017/0276122 A1* | 9/2017 | Van Den Aker | F03G 7/065 |
| 2018/0030580 A1* | 2/2018 | Ayers | C22C 19/03 |
| 2018/0036796 A1 | 2/2018 | Mittendorf et al. | |
| 2019/0003024 A1* | 1/2019 | Elliot | A61B 17/00 |
| 2019/0189971 A1* | 6/2019 | Sun | H01L 27/323 |
| 2019/0366441 A1 | 12/2019 | Lebed | |
| 2021/0170685 A1 | 6/2021 | Wynne et al. | |
| 2021/0201708 A1* | 7/2021 | Wang | G09F 9/301 |
| 2021/0320134 A1 | 10/2021 | Kramer | |
| 2023/0142146 A1* | 5/2023 | Kilchyk | B33Y 80/00 |
| | | | 428/218 |

FOREIGN PATENT DOCUMENTS

| | | |
|---|---|---|
| EP | 3822006 A1 | 5/2021 |
| JP | H0346679 A * | 2/1991 |

OTHER PUBLICATIONS

Alshebly et al.; "Review on Recent Advances in 4D Printing of Shape Memory Polymers"; European Polymer Journal; 159; Aug. 16, 2021, 20 pages.
Extended European Search Report for Application No. 22205141.9, dated Mar. 30, 2023, 8 pages.

* cited by examiner

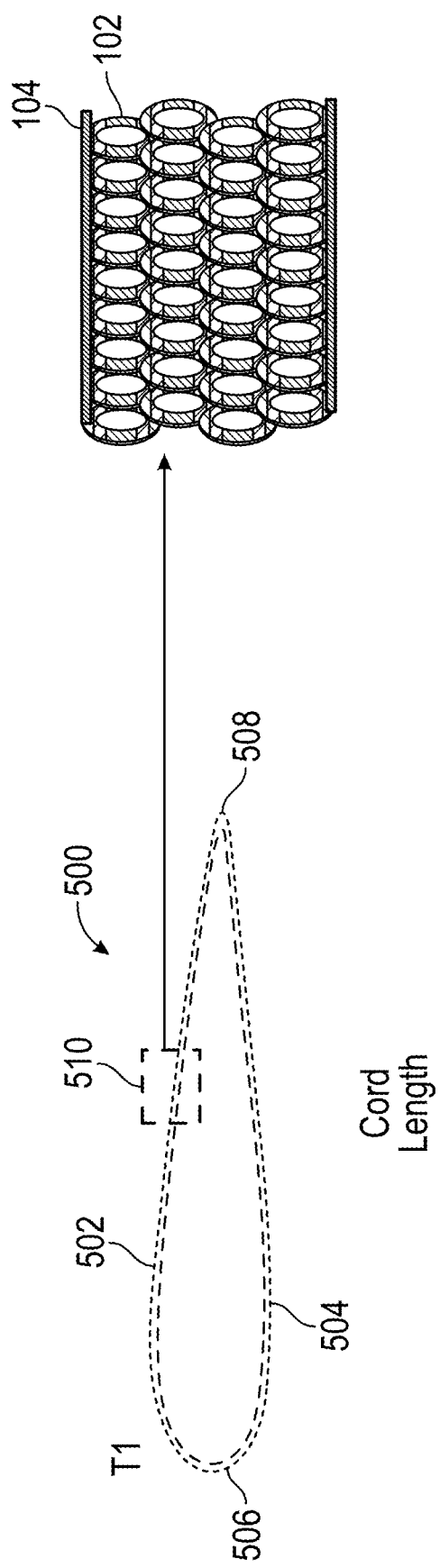
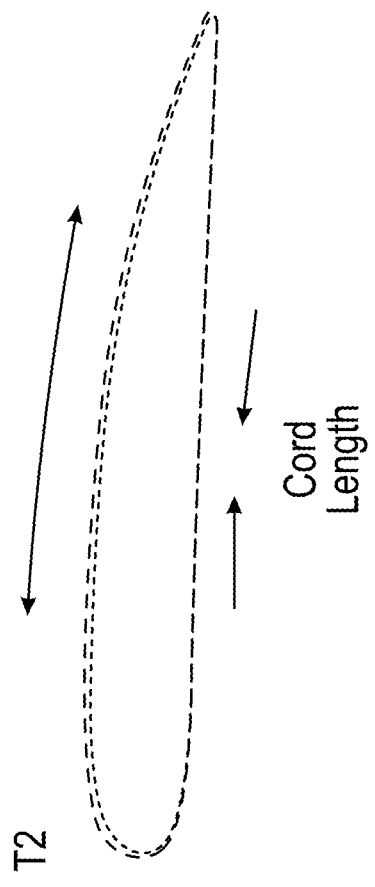
FIG. 7A
FIG. 7B

ARTICLES HAVING THERMALLY CONTROLLED MICROSTRUCTURE AND METHODS OF MANUFACTURE THEREOF

BACKGROUND

This disclosure relates to articles having a thermally-controlled microstructure and to methods of manufacture thereof. In particular, this disclosure relates to articles having a thermally-controlled microstructure that is manufactured by additive manufacturing.

Articles that operate under variable thermal conditions are often provided with clearances to accommodate dimensional changes that occur with temperature. For example, section of railroad lines are separated from one another by a gap to provide for extensions in length that occur when the temperature increases. The gap prevents the sections of the railroad from contacting one another and undergoing buckling.

Clearances however, have detrimental effects on the performance of turbomachinery. Efficiency and operating range decrease with larger clearances. One of the detrimental effects of clearance in turbomachinery is related to non-equal thermal expansion by different components that form the turbomachinery such as the impeller, shroud casing and the volute (volutes are attached to the shroud and form a tangential part, resembling the volute of a snail's shell, which collects the fluids emerging from the periphery of the turbomachinery). While, the impeller may be additively manufactured to avoid extensive geometry changes under the influence of centrifugal forces at elevated temperatures, shrouds are always expanding when heated and pressurized. This expands the clearance and minimizes efficiency of the turbomachinery. It is therefore desirable to minimize thermal expansion so that such clearances can be minimized and efficiency improved.

BRIEF DESCRIPTION

In an embodiment, an article comprises a plurality of structural units, wherein each structural unit comprises a first portion; a second portion; wherein the second portion contacts the first portion; and a third portion; wherein the third portion is in communication with the first portion and the second portion and is more compressible than the first portion and the second portion; wherein the first portion comprises a first shape memory alloy having a first preset state and wherein the second portion comprises a second shape memory alloy that has a second preset state; wherein the second preset state is different from the first preset state.

In another embodiment, the plurality of structural units form a repeat unit.

In yet another embodiment, the repeat unit repeats itself throughout a volume of an article.

In yet another embodiment, the plurality of structural units are periodically spaced.

In yet another embodiment, the plurality of structural units are randomly distributed throughout a volume of an article.

In yet another embodiment, each structural unit has a random shape.

In yet another embodiment, the first portion and the second portion each have domain sizes ranging from 10 micrometers to 20 millimeters and are placed in position using additive manufacturing.

In yet another embodiment, the first shape memory alloy has a similar chemical composition as the second shape memory alloy.

In yet another embodiment, the first preset state acts as a restraint on the first preset state.

In yet another embodiment, the article displays no change in shape or dimension upon experiencing a change in ambient conditions.

In yet another embodiment, the article expands with a change in ambient conditions.

In yet another embodiment, the article contracts with a change in ambient conditions.

In yet another embodiment, the article has a negative Poisson's ratio.

In yet another embodiment, the structural unit further comprises a plurality of first portions and a plurality of second portions, wherein the respective first portions and the respective second portions are in contact with one another.

In yet another embodiment, the structural units are in the form of discrete particles or regions.

In yet another embodiment, the article includes cylinders and pistons used in internal combustion engines, shrouds, gears, casings, rotors, crankshafts, gears and bearing components.

In an embodiment, a method comprises adding a first portion to a second portion via additive manufacturing to form a structural unit; wherein the first portion and the second portion are arranged in a manner to enclose a third portion; wherein the third portion is more compressible than the first portion and the second portion; wherein the first portion comprises a first shape memory alloy having a first preset state and wherein the second portion comprises a second shape memory alloy that has a second preset state; wherein the second preset state is different from the first preset state.

In another embodiment, the method comprises arranging the structural units to be a repeat unit.

In yet another embodiment, the structural unit has a random shape.

In yet another embodiment, the structural unit is randomly distributed.

BRIEF DESCRIPTION OF THE DRAWINGS

The following descriptions should not be considered limiting in any way. With reference to the accompanying drawings, like elements are numbered alike:

FIG. 7A depicts an airfoil made from the structural units detailed in the FIG. 6C; and FIG. 7B depicts the airfoil of the FIG. 7A undergoing a change in shape and size upon being exposed to a temperature change.

DETAILED DESCRIPTION

Figure 1:
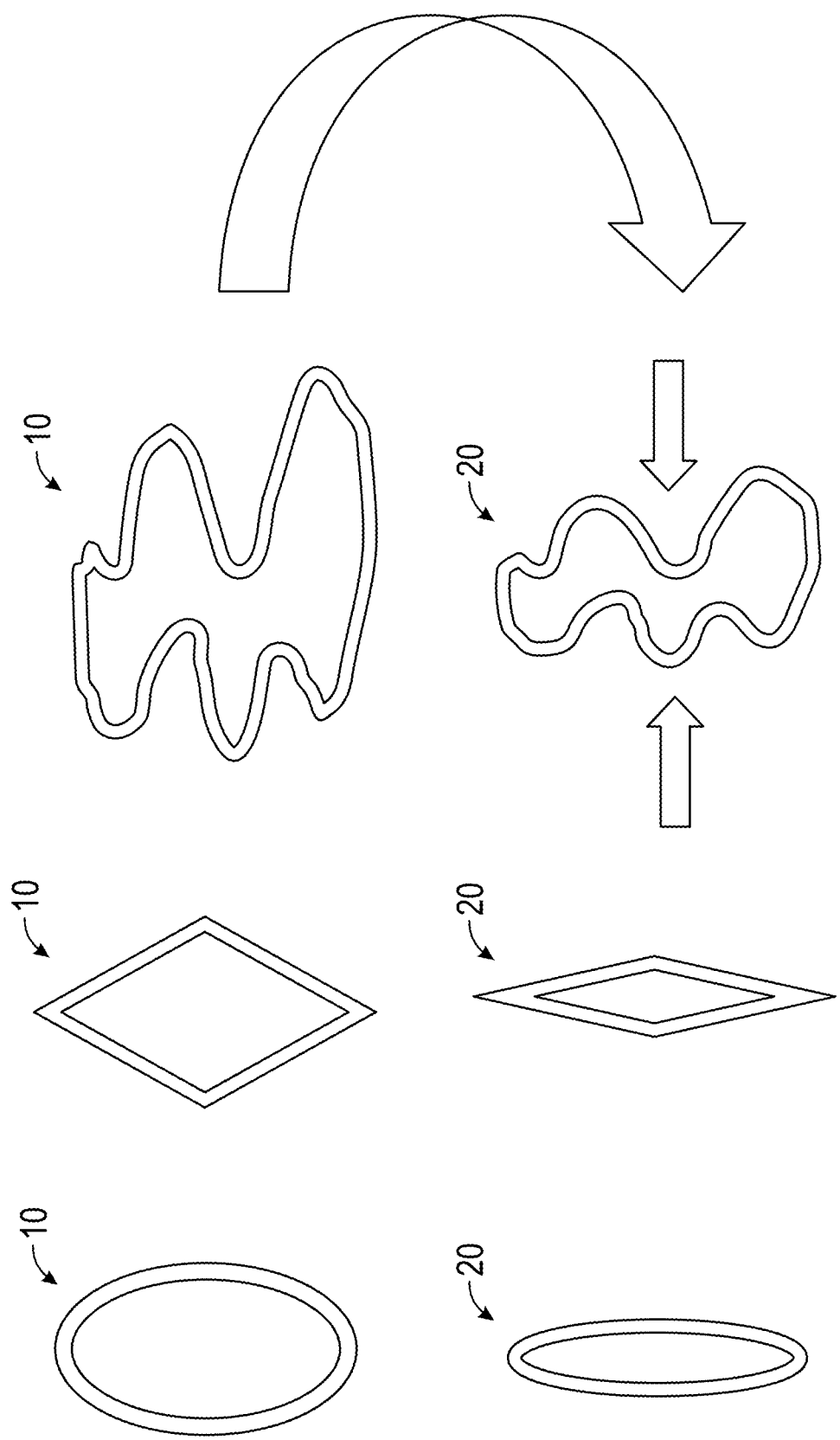
FIG. 1 is a depiction of different shapes manufactured from shape memory alloys when subjected to a temperature change.

A detailed description of one or more embodiments of the disclosed apparatus and method are presented herein by way of exemplification and not limitation with reference to the Figures.

Disclosed herein are articles manufactured via additive manufacturing that comprise at least two portions that are in contact with one another, where each portion has a property that can act as a restraint on the same property displayed by the other portion. The article comprises composite units that contain structural units that comprise a first portion and a second portion that are in contact with one another. The first portion comprises a first shape memory alloy and the second portion comprises a second shape memory alloy. The structural units are repeat units that may contain a third portion that is enclosed within the repeat unit and is compressible. The structural units may be periodic or aperiodic. The composite units may also be periodically or aperiodically arranged.

In one embodiment, the first portion and the second portion (which are in direct contact with one another) both are shape memory alloys that have different preset dimensions to which they return to upon being activated. The first portion has a first preset size while the second portion has a second preset size that is different from the first preset size. When the structural unit is activated, the first portion therefore either restrains or enhances the second portion thereby causing the article to expand, contract or remain unchanged in size. This feature of a first portion acting as a restraint on a second portion (i.e., controlling the expansion of the second portion) may be used to design articles that can display a particular property in response to a change stimulus.

In an embodiment, the article may comprise a plurality of repeating structures (structural units) each of which contains the structure detailed above, i.e., the first portion that controls at least one property of the second portion. The plurality of structural units contact one another in such a manner that the article can be made to expand, contract or remain with its dimensions unchanged upon experiencing a change in ambient conditions. The change in ambient conditions may include a change in temperature, pressure, or a combination thereof. Each repeating structure generally comprises at least two portions—the first portion and the second portion, but may optionally comprise a third portion, which may form a matrix material. This will be detailed later.

The first portion and the second portion include shape memory alloy compositions. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy foam is preferably at or below the austenite transition temperature (at or below As). Subsequent heating above the austenite transition temperature causes the expanded shape memory foam to revert back to its permanent (preset) shape and dimensions. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, super elastic effects and high damping capacity.

Suitable shape memory alloy materials for fabricating the first portion and the second portion include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. A preferred shape memory alloy is a nickel-titanium based alloy commercially available under the trademark NITINOL from Shape Memory Applications, Inc. Selection of a suitable shape memory alloy composition depends on the temperature range where the component will operate.

As noted above, the first portion has a different preset dimension from the second portion. When the structural unit is activated, the first portion and the second portion undergo a transformation between transformation between the martensite and austenite phases. Since the first portion has a different preset dimension (or shape) from the second portion, the activation causes the first portion to impose a restraining force (or an enhancing force) on the second portion, thus producing a change in the dimensions and/or shape of the structural unit from those dimensions and/or shape that the first portion and the second portion would have if they were not in contact with one another.

Both the first portion and the second portion are arranged in their respective configurations via additive manufacturing. Additive manufacturing involves the addition of components to an existing structure thereby permitting special configurations that may not be available to other subtractive manufacturing processes (such as milling, grinding, drilling, and so on). Additive Manufacturing (AM)) is a computer-controlled sequential layering of materials to create three-dimensional shapes. A 3D digital model of the item is created, either by computer-aided design (CAD) or using a 3D scanner.

While this disclosure only references articles that comprise a first portion and a second portion, it is understood that an article can comprise more than two portions that influence one another. An article can therefore comprise a plurality of different portions arranged in such a manner so as to restrain or enhance a particular property in a neighboring portion. The net result is that an article that comprises the first and second portions may expand, contract or remained unchanged in shape.

FIG. 1 is a prior art depiction of an article 10 that undergoes a change in dimensions upon being subjected to variable temperatures respectively. The article 10 is shown in three different shapes prior to being subjected to a temperature change. The article comprises a shape memory alloy (such as Nitinol 60). After being subjected to a temperature reduction, the article 10 (now article 20) is of a much smaller size. It goes back to its original size upon being subjected to an increase in temperature. This behavior however, can be advantageously utilized by combining sections of materials that have different preset original sizes so that when a composite material containing these different sections is subjected to a temperature change, the different sections either restrain or enhance one another to produce unexpected properties or unexpected dimensional changes.

Figure 2:
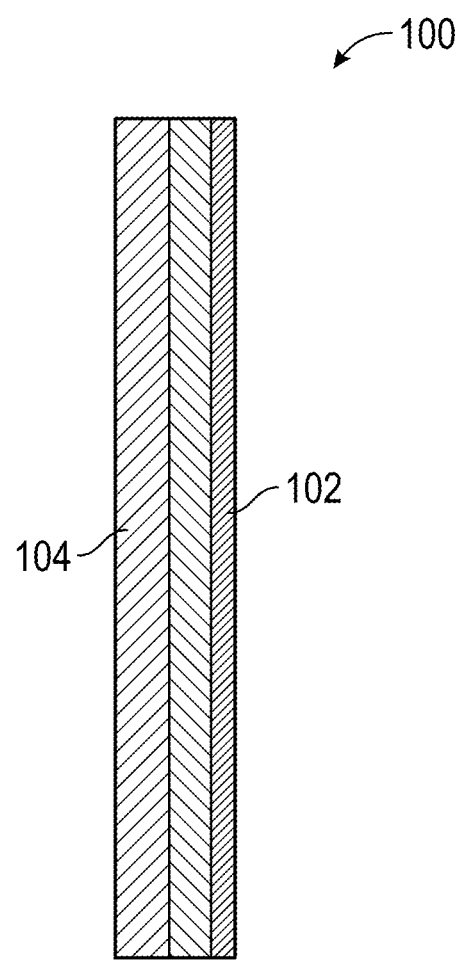
FIG. 2 is a schematic depiction of an article that comprises two different portions where each portion displays a different property value when subjected to a change in ambient conditions.

FIG. 2 depicts one embodiment of an article 100 that is manufactured via additive manufacturing using two portions—a first portion 102 and a second portion 104 that have at least one property where the first portion 102 restrains or enhances a particular behavior in the second portion 104. For example, the first portion 102 may have a first preset state (e.g., dimension or shape) while the second portion 104 will have a second preset state (e.g., dimension or shape) that is different from the first preset state. Upon activation, the first portion and the second portion tend to return to their respective preset states, but since the first portion and the second portion have different preset states they tend to restrain (or enhance) one another to occupy a composite shape that is different from the original preset shape of either the first portion or the second portion. The activating stimulus is typically a change in temperature.

Figure 3:
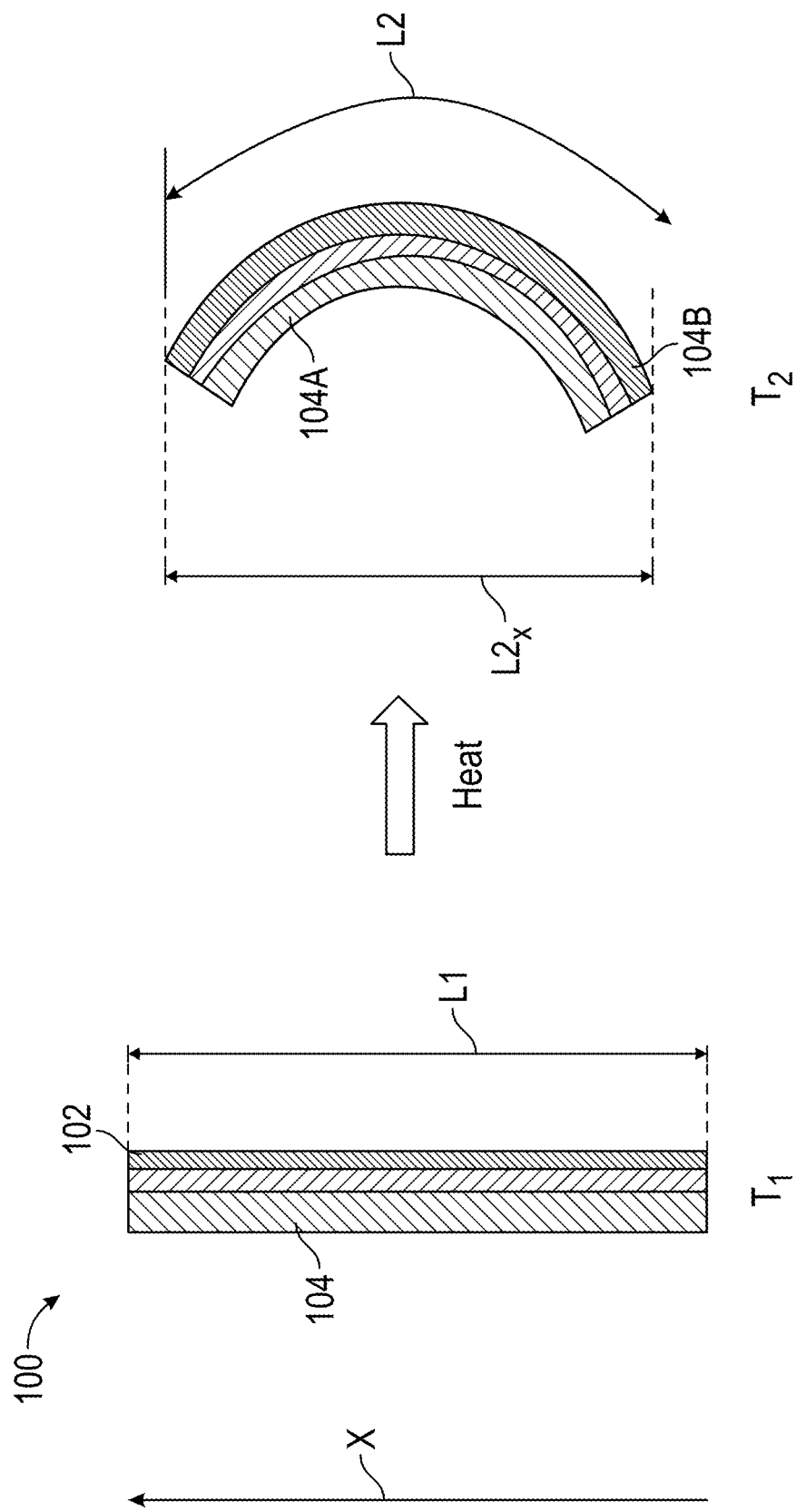
FIG. 3 is a schematic depiction of the behavior of the article of FIG. 2 when subjected to a change in temperature.

The FIG. 3 depicts the behavior of the article 100 of length $L_1$ (measured in the X direction) when it is subjected to a temperature increase to temperature $T_2$ (from an original temperature $T_1$). Upon being heated to the temperature $T_2$ (which is greater than $T_1$), the first portion 102 which has a first preset state increases in length to a value of $L_2$ (which is greater than $L_1$), while the second portion 104, which has a second preset state changes in length to a value of $L_{2x}$, which is less than $L_1$. The second portion 104 which undergoes contraction (or expands less than the first portion) therefore restricts the expansion of the first portion 102 and vice versa. The net effect is that the curvature of the article 100 may be increased because the contracting second portion 104 acts as a restraining force on the expanding first portion 102.

In one embodiment, by choosing the proper weight ratio of the first portion 102 to the second portion 104 and a proper geometry in which to combine with first portion with the second portion, the article can be designed to have no expansion (or contraction) or alternatively, to either expand or contract a desired amount. In another embodiment, by choosing the points of contact and location of the first portion 102 with the second portion, the article can be designed to have no expansion (or contraction) or alternatively, to either expand or contract a desired amount. In yet another embodiment, by choosing the proper weight ratio of the first portion 102 to the second portion 104 and by choosing the points of contact and location of the first portion 102 with the second portion, the article can be designed to have no expansion (or contraction) or alternatively, to either expand or contract a desired amount.

Figure 4:
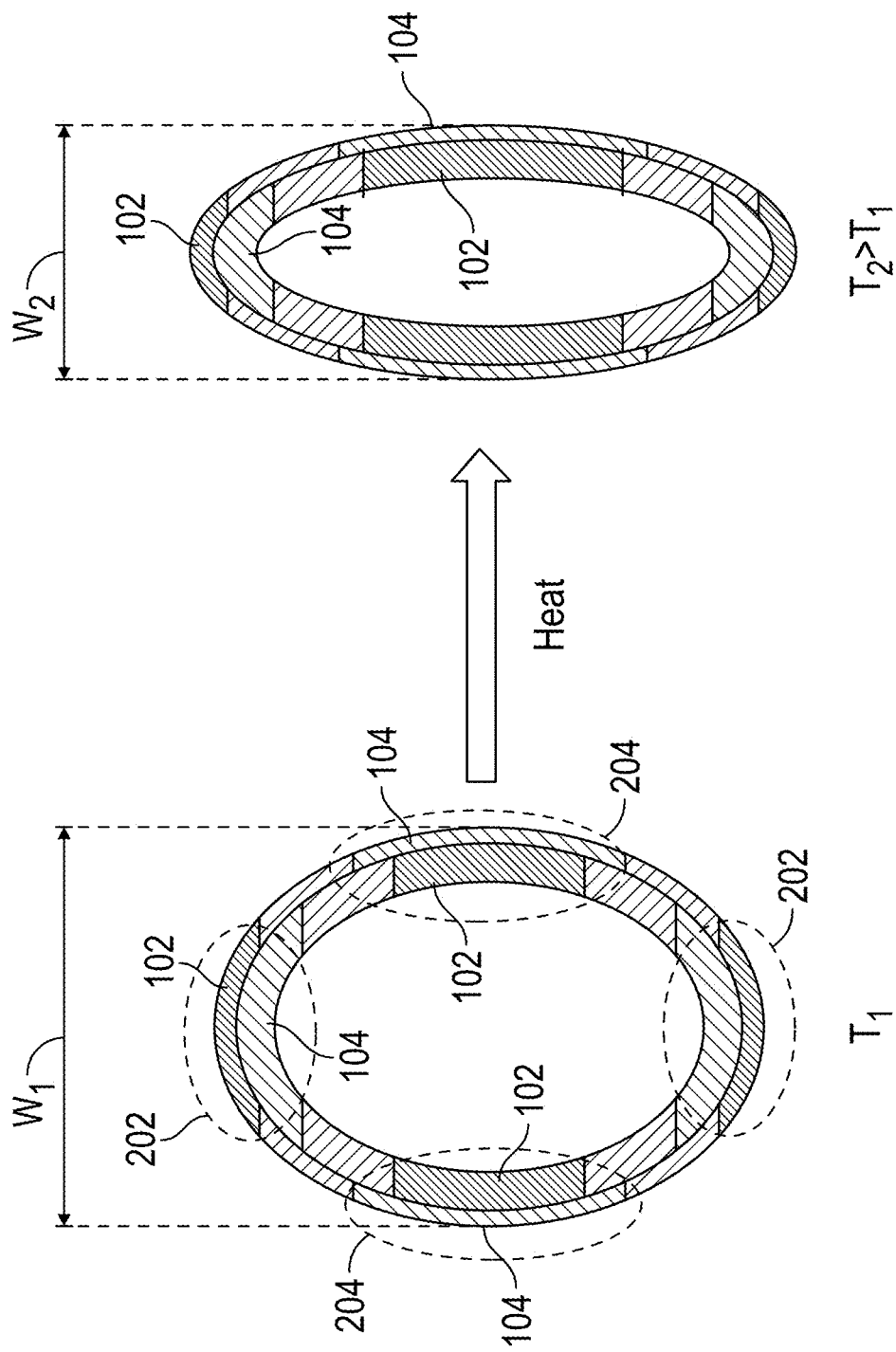
FIG. 4 is a schematic depiction of the behavior of an article in the shape of a circle when subjected to a change in temperature.

By combining several such first portions 102 with several second portions 104 at different locations as seen in the FIG. 4, the change in dimensions of the article 100 can be varied in response to changing temperatures. The FIG. 4 depicts an article 100 that contains 2 different combinations of the first portion 102 with the second portion 104. At the opposing poles 202 of the article 100, the first portion 102 lies on the outer portion of the article 100, while the second portion 104 lies on the inner portion of the article 100. At the opposing equatorial regions 204, the first portion 102 lies on the inner portion of the article 100, while the second portion 104 lies on the outer portion of the article 100. The net effect of this combination (when the temperature is increased from temperature $T_1$ to temperature $T_2$) is to cause the curvature of the polar regions 202 to increase (i.e., the average radius of curvature decreases at the polar regions 202), while the curvature of the equatorial regions 204 decreases (i.e., the average radius of curvature increases at the equatorial regions 204). This combination of responses from the polar regions 202 and the equatorial regions 204 promotes a reduction in width $w_1$ of the article 100 to a width $w_2$.

From the FIG. 4 it may be seen that by combining the first portion 102 and the second portion 104 in various manners, the size of the article may be increased, decreased or kept constant (in size and shape) with varying ambient environmental conditions (e.g., temperature, pressure, and the like). This is depicted in the FIG. 5A where an article 100 having a first portion 102 and a second portion 104 decreases in size upon undergoing a temperature increase from T1 to T2. In the FIG. 5A, the first portion 102 is in the form of a semi-circle and contacts the second portion 104 at its inner periphery (the first portion's inner periphery). A plurality of first portions 102 contact a plurality of second portions 104 along the inner periphery of the first portions 102.

Figure 5B:
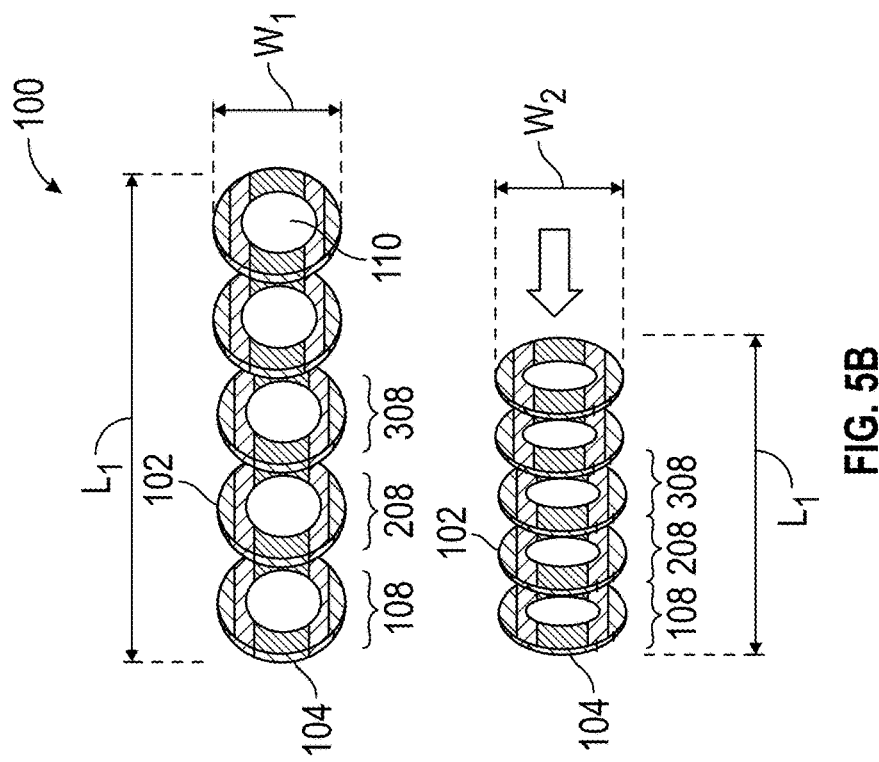
FIG. 5B is a schematic depiction of the behavior of an article when subjected to change in temperature.
Figure 5A:
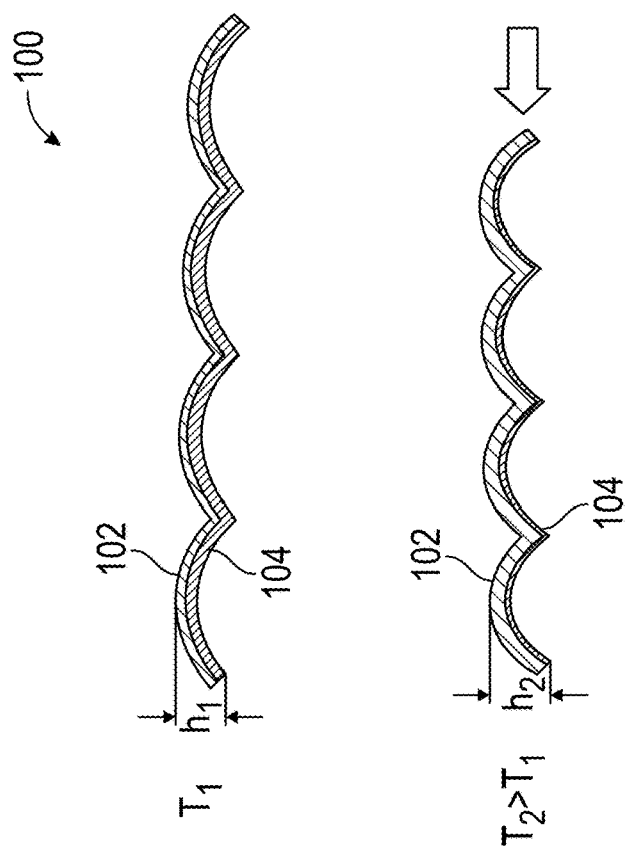
FIG. 5A is a schematic depiction of the behavior of an article when subjected to change in temperature.

The restraint facilitated by the second portion on the first portion (or vice versa) causes the article to shrink in length rather than increase as seen in the FIG. 5A. The curvature of each section of the article 100 however increases. Since a plurality of second portions 104 act to restrain a plurality of first portions 102, there is a cumulative effect on the decrease in length of the article, which is accompanied by an increase in the height "$h_2$" of the article (because of the increase in the curvature or each section of the article 100) from original height $h_1$. This combination thus produces a pseudo "negative Poisson's ratio", where the material upon being heated decreases in length, while simultaneously increasing in height (or width). This is an unexpected result.

A similar situation may be witnessed in the FIG. 5B, where a plurality of the articles (similar to article 100 of the FIG. 4) (also called repeated structural units) are in contact with one another. In an embodiment, a plurality of articles 100 (e.g., 108, 208, 308, and so on) may be in contact with one another (e.g., bonded together). In the FIG. 5B, each article (e.g., 108) comprises a first portion 102 and a second portion 104 arranged in a manner similar to that of the FIG. 4. When the temperature is increased from $T_1$ to $T_2$, each of the articles 108, 208, 308, and so on, changes shape from a circle to an ellipse. The combined length "L" of the article decreases from $L_1$ to $L_2$, while its width "W" increases from $W_1$ to $W_2$ with the increase in temperature.

From the FIGS. 5A and 5B, it may be seen that the plurality of first portions and the plurality of second portions are never in continuous contact with one another. In other words, there is no domain (either of the first portion or of the second portion) that percolates through the entire mass of the article 100. The first portion and the second portion exist in the form of discrete domains throughout the mass of the article. Each portion retains its original properties even when formed into an article.

The FIGS. 4, 5A and 5B demonstrate that by combining different elements with different values (for a given particular property or for a plurality of properties) together, materials can be produced that display unexpected behavior when subjected to known changes in ambient conditions.

In an embodiment, the first portion and the second portion detailed above in the FIGS. 2-5B may be placed in a desirable location with respect to each other via additive manufacturing. Additive manufacturing may be used to add domains of the first portion to the second portion in sizes of 10 micrometers to 20 millimeters, preferably 15 micrometers to 15 millimeters and more preferably 20 micrometers to 10 millimeters. This arrangement of domains may be used to produce materials that expand, contract or retain their original dimensionality upon being subjected to a change in ambient conditions. Changes in dimensionality or geometry can be controlled even when ambient conditions are changed.

In one embodiment, with reference to the FIGS. 5A and 5B, the article 100 can comprise repeated structural units 108, 208, 308, and so on, wherein each structural unit comprises the first portion 102 and the second portion 104. Each structural unit 100 contacts a neighboring unit at a point or at a surface. The repeated units act in concert with one another to expand, contract or to remain unchanged in size or shape when subjected to changing environmental conditions (e.g., temperature, pressure, chemical environment, electrical environment, and so on). These repeat units can extend in space in all directions and can contain a third portion 110, which generally comprises a compressible material. The material that forms the third portion 110 is more compressible than the material that forms the first portion and the second portion. The repeat units can have long range order—i.e., they can uniformly extend throughout the material. On the other hand, they can be randomly distributed throughout the material. This is demonstrated in the FIGS. 6A, 6B and 6C.

The compressible material (that forms the third portion 110) may be a fluid such as air, an inert gas (e.g., nitrogen, carbon dioxide, argon, and the like), a supercritical fluid (e.g., liquid carbon dioxide, and the like), an elastomer (e.g., polyisoprene, polybutadiene, nitrile rubber, and the like), that can undergo compression when the article 100 (comprising the first portion and the second portion) is subjected to changing environmental conditions. The compressible material permits the article to perform its function without any adverse effect on the components (the first portion and the second portion) of the article. In one embodiment, the third portion 110 may form a continuous path through the article 100.

Figure 6B:
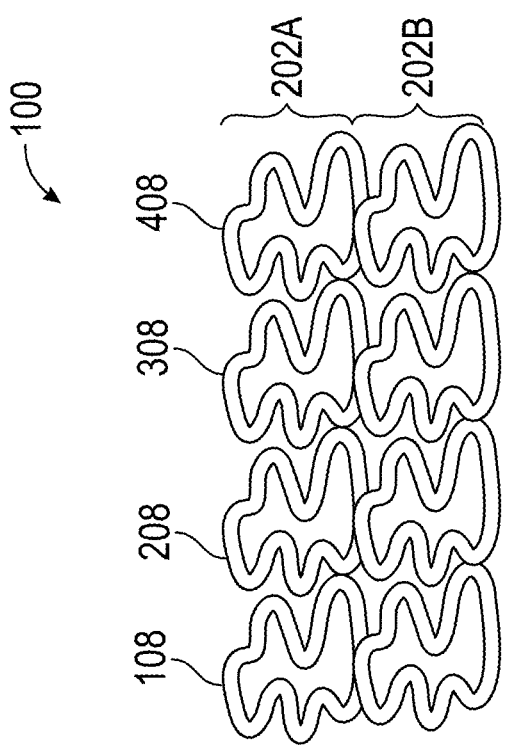
FIG. 6B depicts one embodiment where the structural units have a random shape but are uniformly distributed.
Figure 6C:
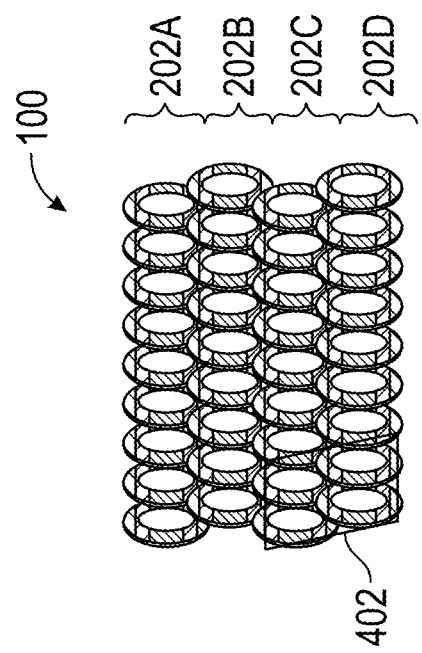
FIG. 6C depicts one embodiment, where the structural units have a uniform distribution in all directions.
Figure 6A:
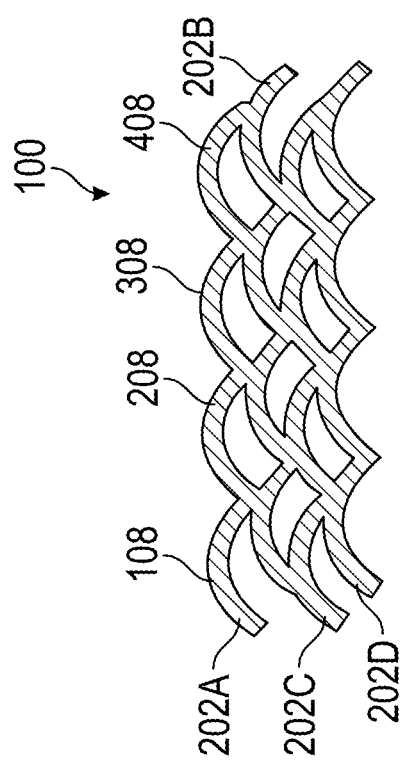
FIG. 6A depicts one embodiment of the article where the structural units are combined in a random fashion to form a composite unit.

FIG. 6A depicts one embodiment of the article 100 where structural repeat units 108, 208, 308, 408, and so on, are combined in a random fashion to form a composite unit 202A. Each structural repeat unit 108, 208, 308, 408, and so on, contain a first portion 102 (not shown) and a second portion 104 (not shown) as detailed above. The structural repeat units 108, 208, 308, and so on are identical to each other and are periodically arranged in one direction. They are however, randomly distributed in a second direction. From the FIG. 6A, it may be seen that the troughs and crests of the composite units 202A, 202B, 202C and 202C do not align with each other in the article 100. As a result, the plurality of composite units 202A, 202B, 202C and 202D are randomly distributed within the article 100 in at least one direction.

FIG. 6B depicts an article 100, where each structural repeat unit 108, 208, 308, 408, and so on have random shapes. The structural repeat units 108, 208, 308, 408, and so on have random but identical shapes and are periodically distributed in at least one direction. In an embodiment, the structural repeat units are periodically distributed in more than one direction. While the FIG. 6B shows the randomly shaped repeat units as having identical shapes, this may not always be the case. The neighboring random shapes may be different from one another if desired. In the FIG. 6B, the random shapes have a first portion 102 (not shown) and a second portion 104 (not shown) as detailed above. The first composite unit 202A is identical with the second composite unit 202B. In other words, the composite unit 202A translates itself uniformly in all directions across the volume of the article 100. FIG. 6C depicts an article 100 that comprises composite units 202A, 202B, 202C, 202D, and so on, where the repeat unit 402 translates uniformly across the volume of the article 100. In this embodiment, the repeat unit periodically repeats itself in all directions. The repeat unit may or may not be the same as the composite unit.

In summary, the repeat units may be combined to form a composite unit. The repeat units may be periodically or aperiodically arranged. The composite units may also be periodically or aperiodically arranged.

FIGS. 7A and 7B depict one exemplary application of the materials disclosed herein. FIG. 7A depicts an airfoil 500 that comprises the composite unit depicted in the FIG. 6C. The airfoil has a leading edge 506, a trailing edge 508, a pressure side 502 and a suction side 504. The section 510 depicts the composition of structure used in the pressure size 502. The composition comprises the first portion 102 and the second portion 104 arranged in such a manner such that upon the application of a temperature variation changes the length of the pressure side and the suction side (See FIG. 7B). However, the pressure side increases in length to a greater extent than the suction side. The composition of the suction side permits it to expand to an amount greater than the pressure side thus causing a change in the airfoil profile as seen in the FIG. 7B.

Figure 8:
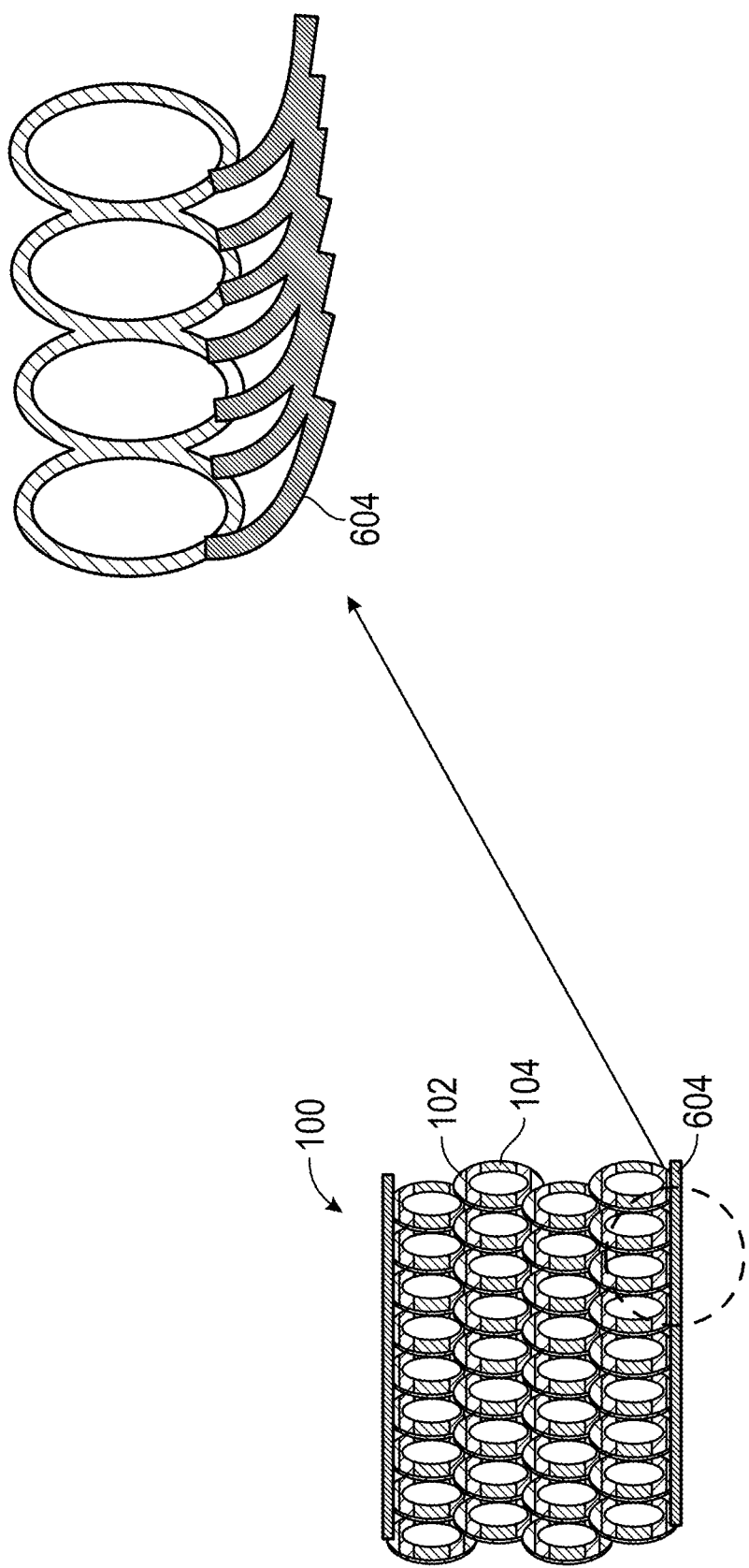
FIG. 8 depicts an exemplary method of modifying a surface of an article.

FIG. 8 depicts another application of the concept. The article 100 comprises a plurality of structural units 602 each of which comprises a tail 604. The respective tails contact each other to form a surface of the article 100. Here each structural unit is in communication with a tail. The plurality of structural units contains the first portion 102 (not shown) and the second portion 104 (not shown) as detailed above.

The structural units will change shape (or dimensions) or remain unchanged when subjected to a change in ambient conditions. The tails 604 can therefore expand or contract (i.e., separate from one another or contact each other more intimately respectively) when the article is subjected to a change in ambient conditions. The change in the position of the tails 604 can change the surface texture of the article.

Articles manufactured by this method can include cylinders and pistons used for internal combustion engines, shrouds, gears, casings, rotors, crankshafts, gears, bearing components and other precision equipment and machinery.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An article comprising:
    a plurality of structural units, wherein each structural unit comprises:
    a first portion of a plurality of first portions;
    a second portion of a plurality of second portions; wherein each first portion of the plurality of first portions contacts each second portion of the plurality of second portions, but where adjacent first portions of the plurality of first portions do not contact each other and where adjacent second portions of the plurality of second portions do not contact each other; wherein the first portion has a property that can act as a restraint on the same property displayed by the second portion when the temperature of the article is changed from T1 to T2; and
    a third portion; wherein the third portion is in communication with the first portion and the second portion and is more compressible than the first portion and the second portion;
    wherein the first portion comprises a first shape memory alloy having a first preset state and wherein the second portion comprises a second shape memory alloy that has a second preset state; wherein the second preset state is different from the first preset state; where the structural units are in the form of discrete particles or regions; where the plurality of structural units form a repeat unit and wherein the repeat unit repeats itself throughout the volume of the article.

2. The article of claim 1, wherein the plurality of structural units are periodically spaced.

3. The article of claim 1, wherein the plurality of structural units are randomly distributed throughout a volume of an article.

4. The article of claim 1, wherein each structural unit has a random shape.

5. The article of claim 1, wherein the first portion and the second portion each have domain sizes ranging from 10 micrometers to 20 millimeters and are placed in position using additive manufacturing.

6. The article of claim 1, wherein the first shape memory alloy has a similar chemical composition as the second shape memory alloy.

7. The article of claim 1, wherein the first preset state acts as a restraint on the second preset state.

8. The article of claim 1, wherein the article displays no change in shape or dimension upon experiencing a change in ambient conditions.

9. The article of claim 1, wherein the article expands with a change in ambient conditions.

10. The article of claim 1, wherein the article contracts with a change in ambient conditions.

11. The article of claim 1, wherein the article has a negative Poisson's ratio.

12. The article of claim 1, where the structural units are in the form of discrete particles or regions.

13. The article of claim 1, wherein the article includes cylinders.

14. A method comprising:
    adding a first portion to a second portion via additive manufacturing to form a structural unit; where the first portion is one of a plurality of first portions and where the second portion is one of a plurality of second portions; wherein each first portion of the plurality of first portions contacts each second portion of the plurality of second portions, but where adjacent first portions of the plurality of first portions do not contact each other and where adjacent second portions of the plurality of second portions do not contact each other; wherein each first portion and each second portion are arranged in a manner to enclose a third portion; wherein the third portion is more compressible than the first portion and the second portion; wherein the first portion comprises a first shape memory alloy having a first preset state and wherein the second portion comprises a second shape memory alloy that has a second preset state; wherein the second preset state is different from the first preset state; wherein the first portion has a property that can act as a restraint on the same property displayed by the second portion; and
    arranging the structural unit to be a repeat unit.

15. The method of claim 14, wherein the structural unit has a random shape.

16. The method of claim 14, wherein the structural unit is randomly distributed.

* * * * *